(12) United States Patent
Escott (10) Patent No.: US 7,747,248 B2
(45) Date of Patent: Jun. 29, 2010

(54) RADIO DEVICE TESTING SYSTEM

(75) Inventor: Daniel R. Escott, Cardiff (GB)

(73) Assignee: ST-Ericsson SA, Plan-les-Ouates (CH)

(*) Notice: Subject to any disclaimer, the term of this patent is extended or adjusted under 35 U.S.C. 154(b) by 673 days.

(21) Appl. No.: 10/563,845

(22) PCT Filed: Jun. 30, 2004

(86) PCT No.: PCT/IB2004/002178

§ 371 (c)(1),
(2), (4) Date: Jan. 5, 2006

(87) PCT Pub. No.: WO2005/004513

PCT Pub. Date: Jan. 13, 2005

(65) Prior Publication Data

US 2008/0027669 A1    Jan. 31, 2008

(30) Foreign Application Priority Data

Jul. 8, 2003 (GB) ................................. 0315931.6

(51) Int. Cl.
*H04W 24/00* (2009.01)
(52) U.S. Cl. ................. 455/423; 455/424; 455/425; 455/432.2; 455/432.3; 709/201; 709/202; 709/203
(58) Field of Classification Search ............. 369/275.3, 369/42.27, 47.1, 47.46, 47.22, 47.21, 44.26; 455/423; 709/201–203
See application file for complete search history.

(56) References Cited

U.S. PATENT DOCUMENTS

| 5,375,126 | A | * | 12/1994 | Wallace | 714/712 |
| 5,732,213 | A | | 3/1998 | Gessel et al. | |
| 6,680,913 | B1 | | 1/2004 | Malmivirta et al. | |
| 6,687,499 | B1 | * | 2/2004 | Numminen et al. | 455/423 |
| 2002/0067743 | A1 | | 6/2002 | Grieswald | |
| 2003/0100299 | A1 | * | 5/2003 | Ko et al. | 455/423 |
| 2004/0058652 | A1 | * | 3/2004 | McGregor et al. | 455/67.13 |
| 2004/0102187 | A1 | * | 5/2004 | Moller et al. | 455/418 |
| 2005/0048925 | A1 | * | 3/2005 | Rands | 455/67.14 |
| 2005/0124296 | A1 | * | 6/2005 | Hayashi | 455/67.11 |
| 2005/0141432 | A1 | * | 6/2005 | Sirbu | 370/242 |

FOREIGN PATENT DOCUMENTS

JP         01-162032       6/1989

(Continued)

OTHER PUBLICATIONS

Koester R. et al., "Iso Test Methods and their Applicability to the GSM Mobile Network System," MRC Mobile Radio Conference, 1991, pp. 25-32.

*Primary Examiner*—Lester Kincaid
*Assistant Examiner*—Charles Shedrick
(74) *Attorney, Agent, or Firm*—Robert Iannucci; Seed IP Law Group PLLC (57) ABSTRACT

A testing system for testing the radio software stack (40) of a radio device (16) is described. The system comprises test control means (10) and perturbation means (38) connected to said radio device. The perturbation means enables perturbation and subsequent monitoring of a radio stack operation. The perturbation means may also directly alter data in a radio message en-route through the software stack. In a further aspect of the present invention a distributed testing system is described enabling a wider range of environmental and real world situations to be simulated to enable thorough testing of the software stack in design for an application.

23 Claims, 7 Drawing Sheets

FOREIGN PATENT DOCUMENTS

| | | |
|---|---|---|
| JP | 06-164626 | 6/1994 |
| JP | 06-216872 | 8/1994 |
| JP | 2001-053726 | 2/2001 |
| WO | WO 00/51380 * | 8/2000 |

* cited by examiner

RADIO DEVICE TESTING SYSTEM

The present invention relates to a testing system for testing radio devices and radio device software stack operation. The invention further relates to software stack perturbation means and testing techniques suitable for perturbing or modifying the operation of such stacks and monitoring and analysing the effect of such perturbation. The present invention has particular, but not exclusive, application to the testing, development and analysis of digital radio protocol software stacks and their performance both in-stack, layer-to-layer and across the air in a radio network.

Digital radio standards enable interoperability between devices in which radios employing the standards are provided. Well known examples of such radio standards which provide a wireless interface between devices include "Bluetooth™", the IEEE802.11 family of standards (e.g. "WiFi™") and the emerging low power low data rate standard known as "ZigBee™". At the time of writing ZigBee is in the process of being ratified by both the IEEE802.15.4 standards group and the ZigBee Alliance group of companies. Other standards include the well known mobile telephonic standard known generically as "GSM", and other emerging "3G" telephonic standards.

Such standards are typically described with analogy to the OSI layer model which defines a communication standard in terms of a stack of layers which perform different functions and services on data messages en-route through the stack. Software application code is usually referred to as the highest layer in the stack. By way of example, say a pair of radio devices are destined for application in a light switch and lamp. The application layer code may monitor the position of the light switch, and when a change is introduced by the user, the application layer records the change, and passes a data bit or byte in a radio message signifying the change to the next "network" or "link" layer.

Code in this network layer may retrieve the radio address of the lamp with which the switch was previously paired, and insert the address into a field in the message. The message is then passed onto a medium access control (MAC) layer which perhaps encrypts the message, and finally the physical layer (PHY) receives the message and the baseband and transceiver circuitry of the radio device transmits the message over the air.

The listening paired radio device in the lamp may then receive the message at the physical layer, and the message is passed up through the MAC and network layers which decrypt, check the message source address and so on until finally the lamp application layer receives the payload data and switches the lamp on.

Hence, such radio stacks effectively generate, format and operate on messages for transmission or messages received. A radio standard document may run to many hundreds of pages describing the services, functions and optional functions of the layers.

The testing of the operation of such radio stacks in development is therefore not trivial, especially when the radios may be deployed in a wide range of both physical, and logical piconet, network or scatternet configurations.

Tektronix™ market a device (BPA100 Bluetooth Protocol Analyzer) for testing Bluetooth™ enabled radio devices. The BPA100 Bluetooth Protocol Analyzer consists of protocol analyzer software and an Air Probe which houses the Bluetooth approved baseband controller and radio. The Air Probe connects to a Windows™ based personal computer. The BPA100 can independently and non-intrusively intercept baseband radio traffic and log, decode and analyze the packet data being transmitted and received. It may also participate in a piconet, introduce intentional errors and act as a known reference device. Similar air or packet "sniffing" and logging devices such as the BPA-D10 from Mobiwave PTE Ltd (Singapore) are also known.

Whilst the aforementioned systems can display intercepted payload data, an error in a stack operation or layer function can only be inferred by those operating the test equipment. In real life environments, radio interference and shadowing may introduce random bits into a message, corrupting the message in such a way that cannot easily be simulated. Furthermore, although the radio standard may be designed to handle the error in a certain way, it is not easy to verify that the handling actually occurs as designed.

Hence, it would be desirable to provide a testing system that enabled a developer to, at a low level, directly influence or perturb a radio stack layer or data therein to enable improved and thorough testing. In addition, it would be desirable if the evolution of a radio message as it passes en-route through a stack could be monitored, to enable more efficient debugging and pinpointing of stack layer errors.

Hence, according to a first aspect of the present invention there is provided a radio device testing system comprising at least one radio device having a software radio stack through which radio messages comprising payload data are processed in accordance with a predetermined radio protocol, and test control means for controlling and monitoring the testing of said at least one radio device via a link therebetween, characterised in that stack perturbation means linked to said stack and to said control means is provided and where, under control of said test control means, said stack perturbation means perturbs an aspect of said radio stack processing.

In a preferred embodiment the system provides stack perturbation means in the form of a software code message dispatcher module which is coupled to the radio stack of a device. The dispatcher and radio device are linked via a serial port and cable to the test control means in the form of a personal computer (PC) which has been provided with scripted test instructions. The message dispatcher has hooks into the stack layers, monitors said layers via said hooks and passes data back to the test and control PC.

The dispatcher also perturbs aspects of operation of the stack according to the test being carried out. For example, a call to the MAC layer may cause said layer to alter a bit that signifies whether encryption is enabled or not for a network or piconet of communicating radio devices. In a master/slave configured network test, the response of the master device in receiving an unencrypted message may be logged by its message dispatcher and supplied to storage for later analysis.

Preferably, radio message monitoring means in the form of a sniffer for monitoring messages over the air is included in the system, which enables a designer to correlate test results comprising over the air message content with perturbed content provided by radio device message dispatchers. For example, a test may comprise perturbation of the network identifier of a master device, and the response of the slave radio devices in suddenly being orphaned from their network, both over the air and in-stack may be recorded and analysed.

Advantageously, in another embodiment radio devices may be physically separated at an extreme of range (e.g. 50 m for a ZigBee radio standard). In such an embodiment, the test and control means comprises a server-client PC network, synchronised via the simple network time protocol (SNTP). Hence, a server controller may initiate synchronised testing over a wide area, with the data from perturbation means being supplied to a central data file for later analysis. This embodiment enables testing in situations much closer to real world environments, with devices being separated over a broad area in a location by walls, ceilings, furniture and so on.

These and other features are further described in the attached claims to which the reader is now directed.

The present invention will now be described, by way of example only, and with reference to the accompanying drawings wherein.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

Figure 1:
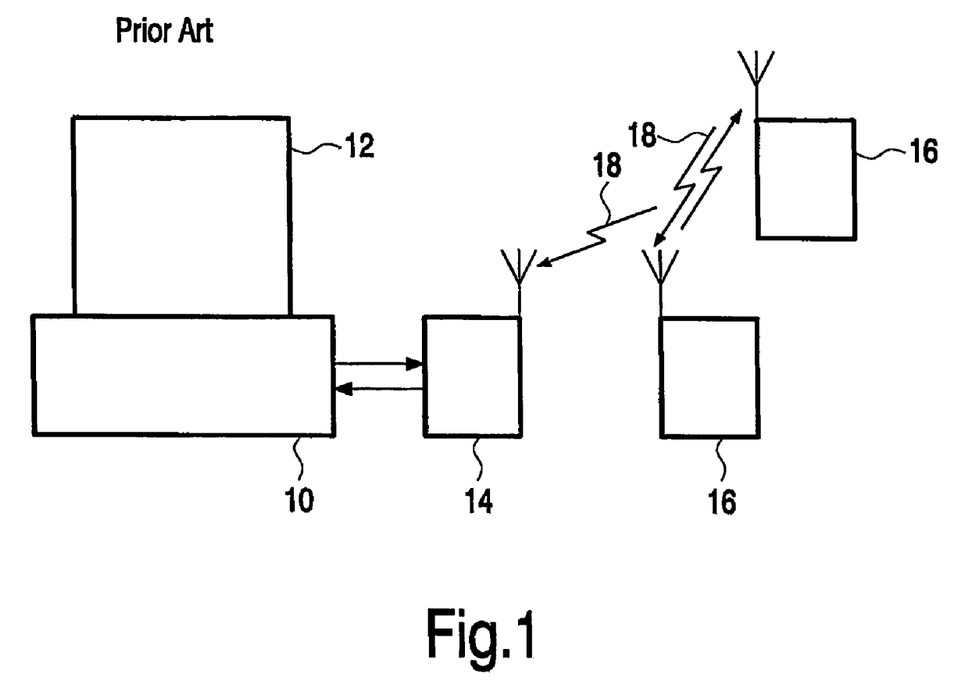
FIG. 1 illustrates a prior art testing system.

FIG. 1 is a diagram of a prior art testing system. The testing system comprises a personal computer 10 complete with monitor 12 connected to a protocol analyser device 14, which in turn can communicate via radio messages 18 to other radio devices 16. The radio devices 16 together with the protocol analyser 14 form a radio network which is tested by the protocol analyser 14 in conjunction with a testing computer 10. An example of a protocol analyser 14 is that called the BPA100 made by Textronix™, which is used for Bluetooth protocol analysing and testing. The protocol analyser BPA 100 is a test tool that can non intrusively and independently intercept baseband traffic and log, decode and analyse the packet data being transmitted and received. Hence analysis over the air is enabled with the prior art system of FIG. 1.

Figure 2:
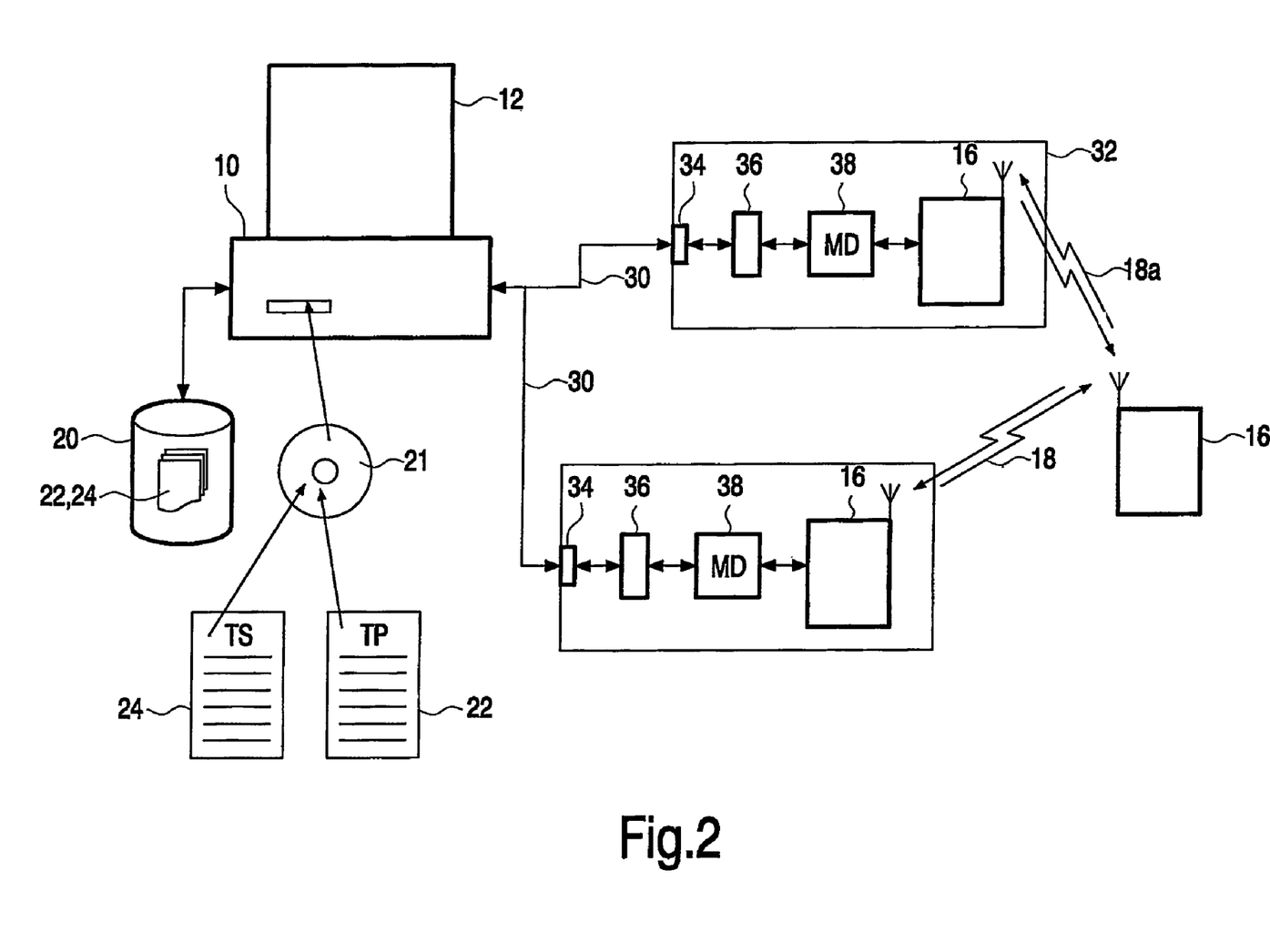
FIG. 2 is a diagram of a testing system in accordance with an aspect of the present invention.

FIG. 2 shows a testing system made in accordance with an aspect of the present invention, in which inter-layer and inter-stack debugging and analysis is enabled. The testing system comprises a personal computer 10 with a display 12 for displaying output. The computer 10 is connected to storage 20 (shown as external storage in the diagram, those skilled in the art will appreciate that storage may be internal to the computer 10) for storing test programs 22 and test scripts 24 supplied on program carrier 21. The carrier is shown in the diagram in the form of an optical compact disc (CD_ROM) but it should be readily appreciated that the program carrier may be embodied as magnetic storage (e.g. a floppy disc), non-volatile external memory storage (e.g. a flash memory "keyring" or "dongle") or as a signal encoding the program instructions, and made available for download over a network or the internet.

The computer 10 has an interface 28 which allows for cable links 30 to external test boards 32 via text board interface 34. The interface 28, link 30 and interface 34 on the test board 34 may be of a standard serial type running at 19,200 kb per second. Alternatively the link 30 and interface 28, 34 may conform to the universal serial bus standard (USB). The test board 32 comprises a serialiser 36 connected to the serial interface 34. The serialiser comprises buffer memory which receives control data and instructions from the test program 22 and test script 24 via the link 30, and buffers said data and commands for delivery to perturbing means in the form of a message dispatcher module 38.

The message dispatcher module 38 in turn supplies received test data and commands to radio device 16 mounted on the test board 32. Also shown in FIG. 2 is a radio device 16 which simply participates in a radio network under test. The network comprises radio devices 16 mounted on test boards 32 and unmounted radio device 16. In operation radio messages 18 between the devices 16 may be perturbed by the message dispatcher module 38. Hence in the diagram radio signal 18a comprises a perturbed or modified radio message whereas at the instant of operation shown in FIG. 2 the radio signal 18 has not been perturbed or modified in any way.

Figure 3A:
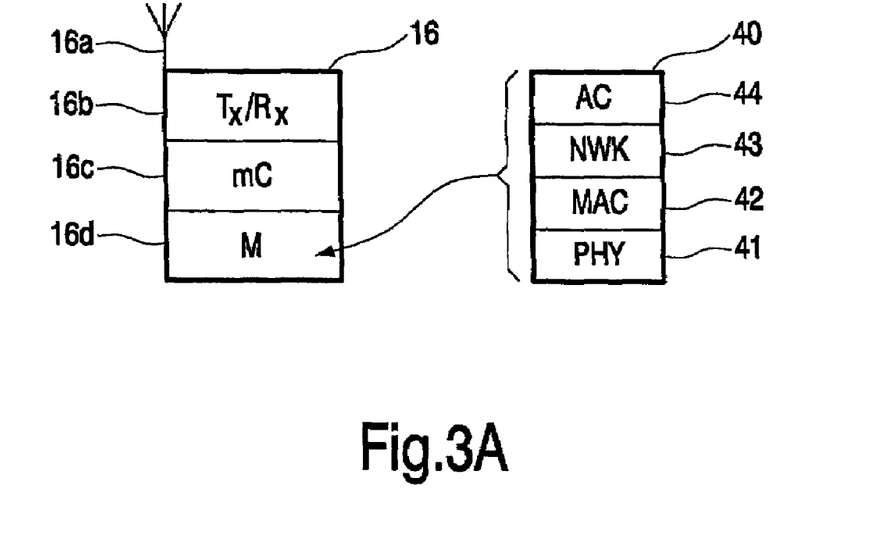
FIGS. 3A and 3B illustrate aspects of a radio device having a software stack and a radio message.

Turning now to the construction of the radio device itself. FIG. 3A shows a typical radio device 16. The device 16 comprises an antenna 16a connected to a transceiver 16b, a microcontroller 16c and memory storage 16d. The memory 16d stores a software radio stack 40 comprising a physical layer 41 (PHY) followed by a medium access control layer 42 (MAC), a network layer 43 (NWK) and an application layer 44 (AC). The depiction of a radio standard or protocol as a stack of layers is well known to those skilled in the art since it follows the OSI method for describing such radio standards.

Figure 3B:
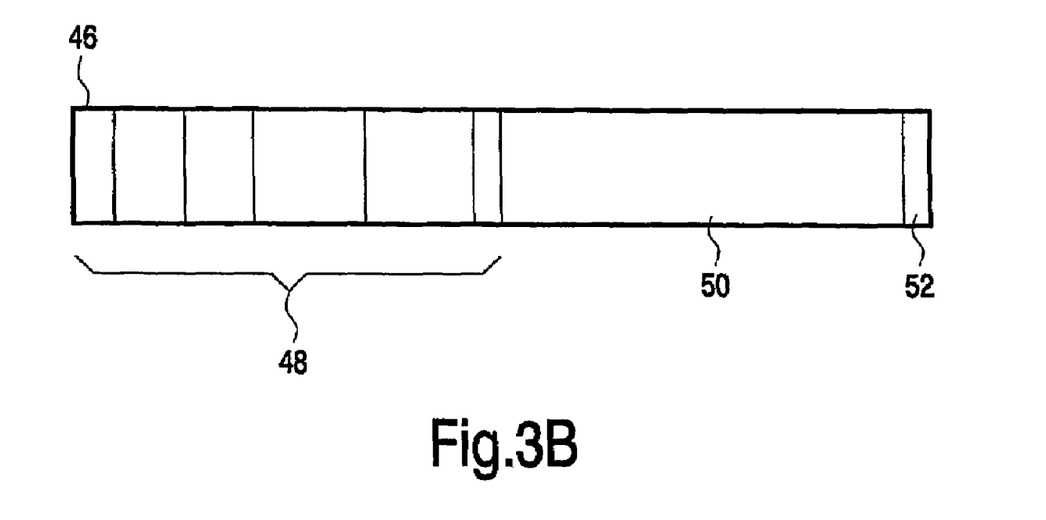

FIG. 3B shows a radio message generated by radio device 16 operating in accordance with the radio stack and protocol rules 40. The radio message 46 in general comprises various header fields 48, data field 50 and checksum field 52. In operation a digital radio receives a radio message 46 at the physical layer 41. Software comprising the physical layer 41 operates on various fields of the message relevant to it and as defined in the radio standard. For example the first header field in portion 48 of the message may be stripped by the physical layer and then passed to software comprising the medium access control layer 42. The message is acted on by each layer and passed up to the next layer until it eventually reaches the application layer 44 which comprises application code which may for example involve turning a light bulb on and off. Payload data in field 50 is in this fashion supplied to the application layer 44 which then operates on said data. An example of a digital radio standard comprising the above layers is that known as IEEE 802.15.4 which is currently being standardised by the Zigbee alliance group of companies. The Zigbee radio protocol is designed for low power, low bandwidth applications such as lighting, instrumentation and home control. A radio protocol and standard commonly known as Bluetooth™ is arranged in a similar fashion in that a software radio stack 40 is provided and instead of network layer 43 a logical link layer is supplied.

Figure 4:
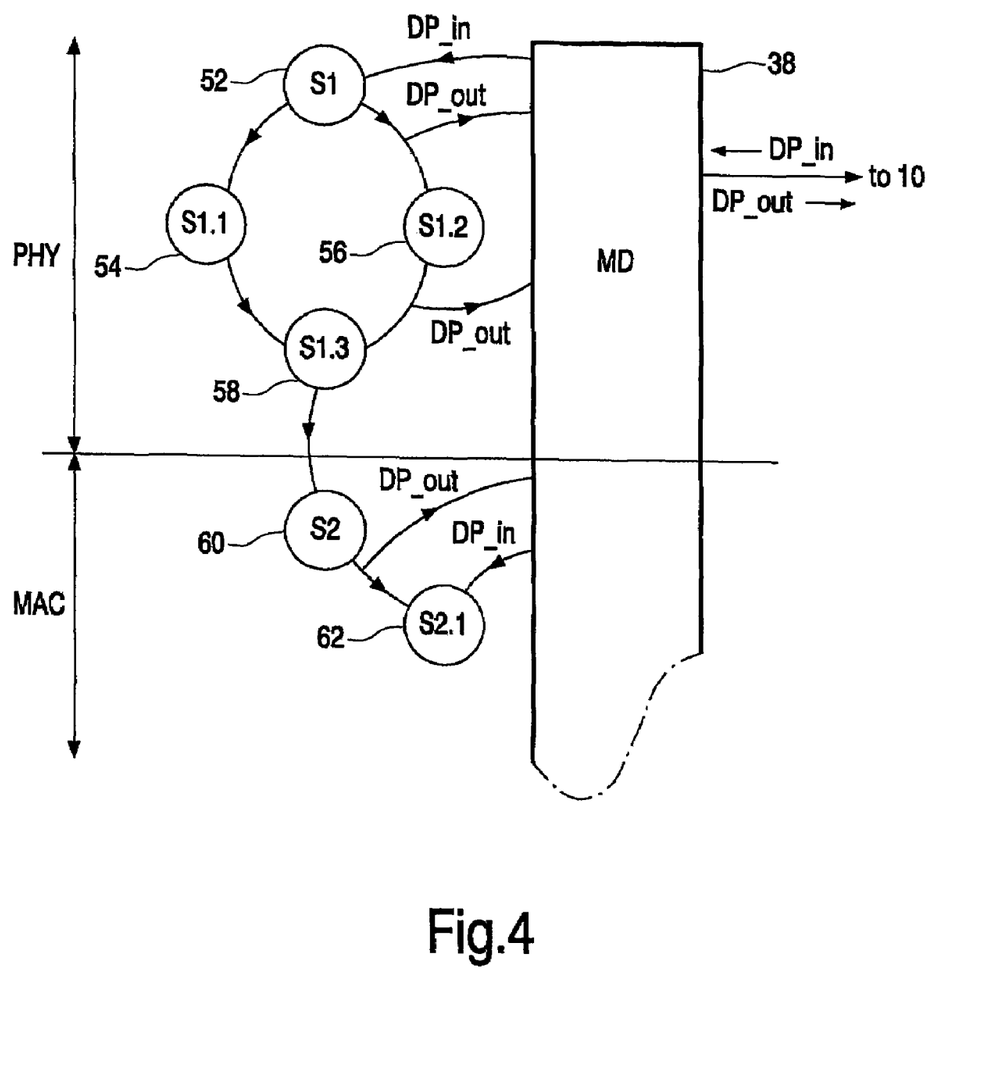
FIG. 4 illustrates operation of perturbation means with respect to a state diagram of the software stack.

The development of such radio protocols or radio standards requires much testing and debugging to ensure the software stack supplied in a radio conforms to the specification as defined by the relevant standards body or group, (for example the Zigbee Alliance). Intricate debugging and testing of for example network layer operations and the way in which a radio network responds to an error event is not trivial. The system of FIG. 2 enables data to be input directly into a function (which may represent a state in a state machine model of the radio stack standard) of a layer of the radio stack hence surreptitiously perturbing, modifying or disturbing the operation of the radio stack. The response of device 16 when receiving a message, which may for example have source address data in the field 48 reserved for source addresses which is not compatible with the rules laid down by the Radio Standard, may be observed. This is achieved in the testing system by incorporation of the message dispatcher 38, which under control of testing computer 10, determines when and what to input directly to the stack of a radio device 16 under test. FIG. 4 illustrates in more detail the operation and function of the message dispatcher module.

In FIG. 4 part of the operation of the software stack is illustrated by a state machine diagram well known to those skilled in the art. The various states (S1, S1.1, S2) that the physical layer may have according to the radio standard are represented as first state S1 52, second state S1.1 54, third state S1.2 56, and so on. The state S1.3 58 is shown as inputting to state S2 60 of the MAC Layer 42, and represents a transfer of the message up through the stack from the physical (PHY) layer to the MAC layer. The MAC layer may then operate on that message to produce a second state S2.1 62. The message dispatcher 38 in this embodiment is a software module which has knowledge of the states and their associated functional calls and parameters according to the radio standard. The message dispatcher hence may input data shown as 'DP_in' in the Figure to state 1 (S1) and also monitor the output of state 1 in the form of stack response data 'DP_out'. For example a first operation which the physical layer may apply upon receiving a radio message may be to check the length of the message. The message dispatcher 38 may perturb such a check, by for example, altering the 'LEN' data in the field of the message to an out of frame (for the radio standard under test) number thereby testing the operation of the functions associated with state 1 and state 1.2.

Furthermore the message dispatcher 38 may have hooks and/or calls into the MAC layer 42, network (NWK) layer 43 and even the application (APP) layer 44 if the developer of the software stack is concurrently developing the application code for whatever application the radio device is ultimately intended for. Message dispatcher 38 also comprises connects via link 30 to test computer 10 to receive data for input 'DP_in' to the stack and also to output intermediate data 'DP_out' from the stack 40 to test computer 10.

Figure 5A:
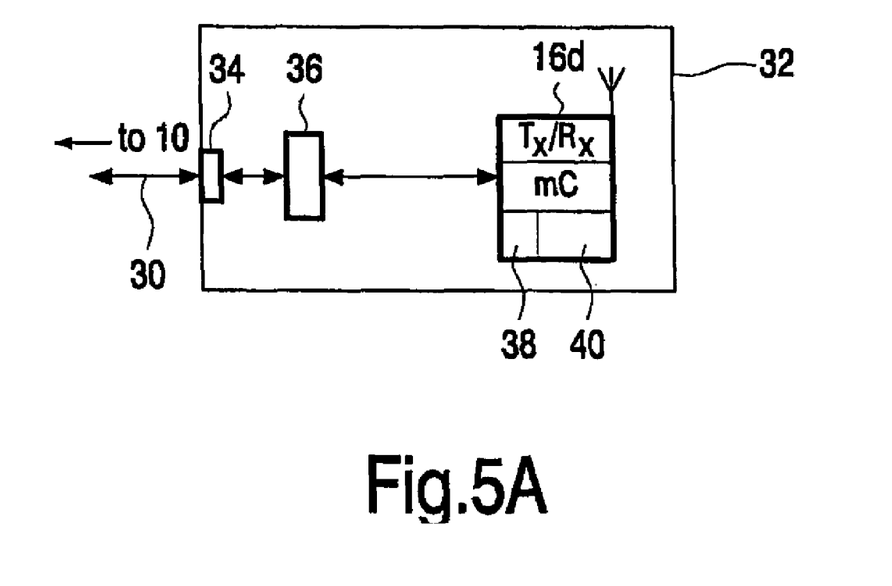
FIGS. 5A and 5B illustrate alternative configurations for said perturbation means.
Figure 5B:
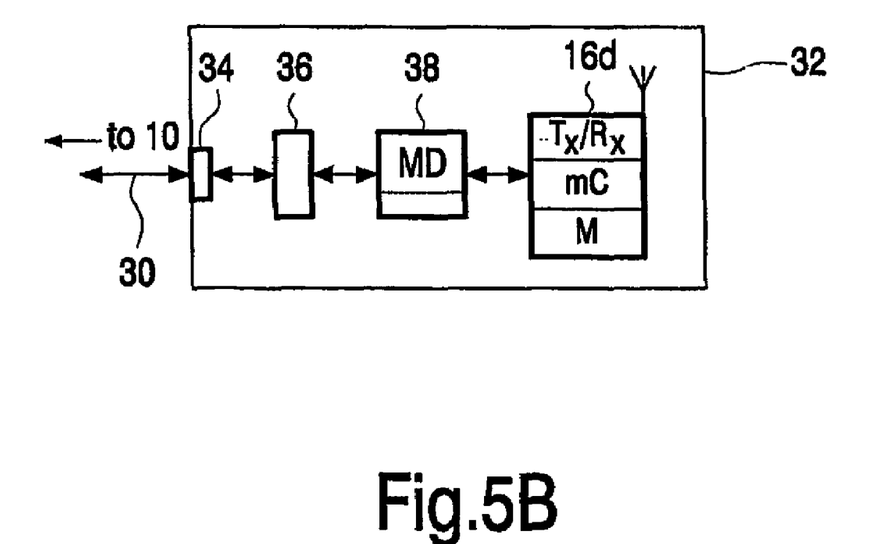

FIGS. 5A and 5B show alternative embodiments for the perturbation means in the form of a software message dispatcher.

FIG. 5A shows the message dispatcher (MD) 38 as being stored in the memory 16' of the radio device 16 under test. Hence in this embodiment the developers of the software stack also include in memory a message dispatcher software module which passes data to and from the software stack (SS) via link 30. Hence in this case the radio device 16 is in fact a modified device for testing and is shown as 16' in the diagram.

FIG. 5B shows a standard radio device 16 and perturbation means 38 embodied in a programmable microcontroller (MC) such as those provided by the well known 8051 or 8051 family of microcontrollers. The microcontroller stores program instructions for despatching messages to and from the software stack of radio device 16.

To drive the testing system of FIG. 2 the following testing procedure was adopted. In a first stage of the testing procedure a test script (TS) is written. This test script informs testing computer 10 of individual radio messages, their data content and at which time the messages are to be issued. After completing the development of the test script 24 each instance of the device 16 under test is mounted on respective test boards 32 and initialised.

Depending on how the test script was constructed the test will automatically begin or require a starting action from the user at test computer 10. Once started, test computer 10 supplies via link 30 to message dispatchers 38 primitive messages according to the script for input to the message dispatcher. The internal messaging response (DP_out) of a software stack 40 is recorded by its respective message dispatcher 38 and supplied back to test computer 10 which then stores the supplied data in storage 20 for later analysis and display.

Of course those skilled in the art will recognise that the test program 22 may indicate in real time the data being received from message dispatchers 38 by displaying said messages and their contents in an appropriate format on display 12.

Example tests that the message dispatcher and system of FIG. 2 may apply include perturbing or modifying a network address in a message and observing the response of the receiving radio in receiving said message containing said unknown address. More than one radio network comprising radio devices 16 may be set up by the development tester, and effects such as interference or simply monitoring whether messages intended for another network are ignored if received by said network under test can be analysed.

Figure 6:
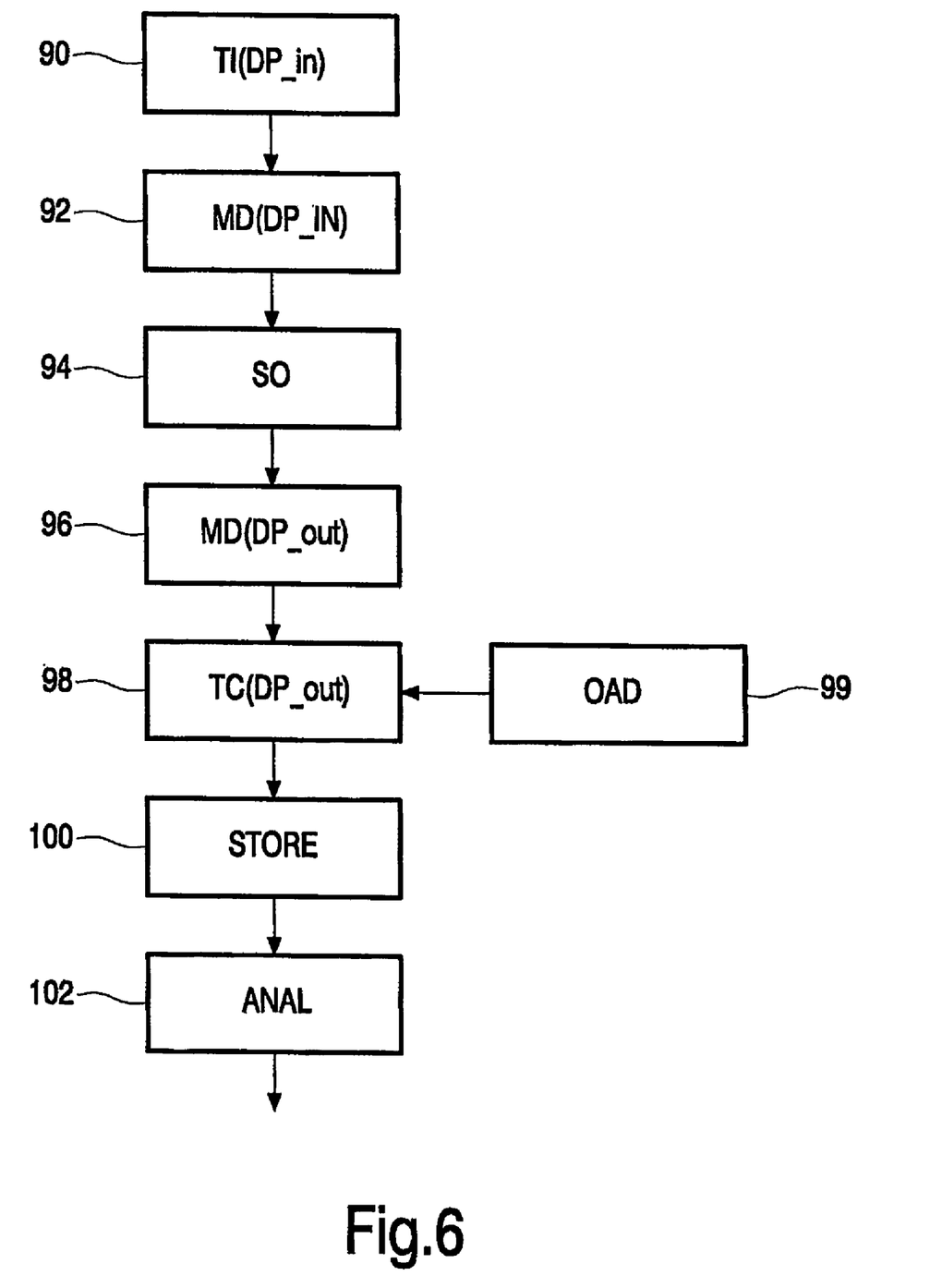
FIG. 6 illustrates an example test sequence operated by a testing system.

FIG. 6 illustrates in general the operation of the system of FIG. 2. At step 90 (TI(DP_in)) the test computer 10 retrieves test instructions and associated data (DP_in) from the test script 24 and supplies said instruction and data via link 30 to serialiser buffer 36 which in turn at step 92 (MD(DP_in)) supplies said test instruction and data to the message dispatcher module 38. The message dispatcher feeds such data into the stack 40 and at step 94 a stack operation (SO) occurs changing the state 52, 54 of the stack 40. The response data associated with this change in the stack is subsequently received by the message dispatcher as 'DP_out' data as reflected at step 96 (MD(DP_out)).

The message dispatcher module then supplies the retrieved data (DP_out) to the test and control computer 10 via link 30 at step 98 (TC(DP_out)). This data is then stored at step 100 in storage 20 and is later analysed at step 102 (ANAL). Hence inter and intra-layer stack operations may be monitored by the message dispatcher and information concerning these layers and function calls of the stack may be supplied back to the test computer for later analysis.

Figure 7:
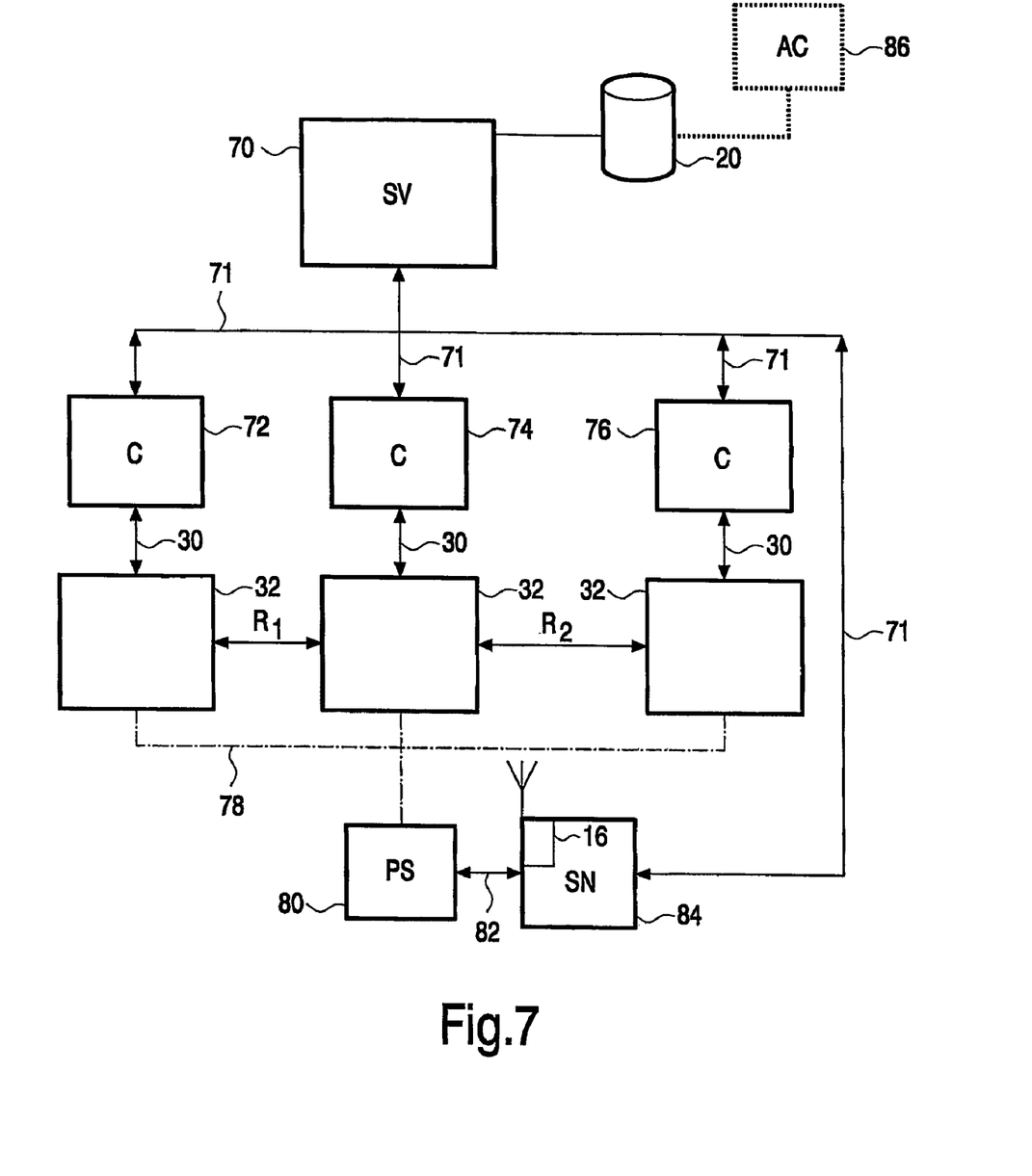
FIG. 7 illustrates a distributed testing system embodiment.

An alternative distributed system embodiment is shown in FIG. 7. The system comprises test control means in the form of a server computer 70 (SV) connected over a network via network link 71 to client control computers (C) 72, 74, and 76. The server computer 70 has access to storage 20 for storing test scripts and the test program to initiate test sequences. In this embodiment each client computer 72, 74, 76 is connected by serial link 30 to a respective test board 32. The test board having mounted thereon a radio device 16 and a message dispatcher module 38 as previously described. The test boards may be advantageously separated physically up to the maximum range indicated in the radio standard for operation.

For example the range of separation R1 between computer 72 and test computer 74 and their respective connected test boards 32 may be for the Zigbee standard about 50 meters. The range R2 separating the test boards associated with client test computers 74 and 76 may be smaller (for example 20 meters), but there may be a physical object such as a wall separating such said test boards. Hence this network or distributed testing system enables a wider testing range and various real life parameters such as furniture which may affect radio interference and other effects to be tested with respect to radio stack and radio network operation.

Also provided in this embodiment is an interruptible joint power supply (PS) 80 which supplies power via power line 78 to test boards 32. The interruptible joint power supply 80 is controlled by radio message monitoring means in the form of a packet analyser or snooper or sniffer 84 (SN). One suitable embodiment of the sniffer comprises a computer with a Zigbee radio module 16 and which is programmed to passively monitor, intercept and log base band radio traffic. The sniffer 84 is provided with a network connection by network cable 71 to the server computer 70 which controls and synchronises the overall testing process. In this embodiment synchronisation of testing between computers 72, 74, 76 is controlled by server computer 70 using the simple network time protocol (SNTP) as specified in the TCP/IP network protocol well known to those skilled in the art of computer networks.

In this embodiment the server poles the client computers 72, 74, 76 once a second to synchronise internal clocks of said computers. Hence the test script 24 may ensure time initialisation and subsequent deployment of messages at specified times across the distributed network. Furthermore, under control of the server computer 70 the sniffer 84 may monitor 'over the air' radio communication in the radio network formed by devices 16 and supply this data back to the server computer 70 for storage in a central data file stored in storage 20. Additionally, the joint power supply 80 may under control of the sniffer computer 84 and server computer 70 interrupt the power to one or more of the test boards participating in the network and monitor the response of those radio devices still powered.

Hence situations in which a device is orphaned from a network may be simulated and over the air radio traffic provided by the sniffer 84 included for analysis together with internal data from the software stacks of devices provided by their respective message dispatchers 38. This over the air data (OAD) is shown in FIG. 6 at step 99 as being supplied to the test control means in the form of server 70 for storage (step 100) and later analysis (step 102) by an analysis computer 86 (AC).

The computer test scripts 24 enable appropriate analysis test scripts to be written since the designer of the test may also, given knowledge of the radio standard, describe an automated analysis script for analysing the data according to the scripted test purpose. For example, if a message should be sent from a device 16 to another device 16 which acknowledges and subsequently acts upon data in the message then, the analysis computer may look at the centrally stored data (comprising over the air and stack data) in storage 20 and provide simple analysis in the form of graphical cues to the tester indicating success or failure at various critical steps in the test.

In the foregoing a testing system comprising test control means and perturbation means is described. The perturbation means enables perturbation and subsequent monitoring of a radio stack operation. The perturbation means may be embodied as a message dispatcher program code module comprising code describing the radio stack state machine. The code module may be embedded in a microprocessor or microcontroller in a testboard having links to a radio device mounted thereon, or may be directly embedded in the microcontroller of a radio device under test. In a method data from a test script/test computer is passed to the perturbation module which accesses the radio stack under test and perturbs a stack operation, and retrieves any response data for supply to the test computer for later analysis.

In a further aspect of the present invention a distributed testing system was described enabling a wider range of environmental and real world situations to be simulated to enable thorough testing and debugging of the software stack in design for an application.

From reading the present disclosure, other modifications will be apparent to persons skilled in the art. Such modifications may involve other features which are already known in the design, manufacture and use of radio testing systems and component parts thereof and which may be used instead of or in addition to features already described herein without departing from the spirit and scope of the present invention.

The invention claimed is:

1. A radio device testing system comprising:
a radio device having a software radio stack including a plurality of logical layers through which radio messages comprising data are processed in accordance with a radio protocol;
test control means for controlling and monitoring testing of said radio device via a link therebetween; and
stack perturbation means, linked to said software radio stack and to said test control means, for, under control of said test control means, altering data of a radio message en route through one of said plurality of logical layers of said software radio stack, by:
receiving the radio message at a first layer of said plurality of logical layers of said software radio stack, the radio message comprising one or more fields;
creating a modified radio message by modifying data of one of the fields of the received radio message; and
transferring the modified radio message to a second layer of said plurality of logical layers of said software radio stack.

2. A testing system according to claim 1, wherein said stack perturbation means is linked to at least one of said layers in said software radio stack.

3. A testing system according to claim 1, further comprising storage means for receiving and storing test data from said test control means and said stack perturbation means in a central data file.

4. A testing system according to claim 1, further comprising radio message monitoring means for intercepting over air radio messages and supplying said message data to said test control means via a link therebetween.

5. A testing system according to claim 1, wherein said test and control means comprises a distributed system of client computers under control of a server computer, each client being linked to at least one radio device and respective stack perturbation means, the radio devices linked to said clients thereby forming a radio network, and wherein said server computer synchronises and controls perturbation, testing and monitoring of said radio network.

6. A testing system according to claim 4, further comprising an interruptible power supply for supplying power to the radio devices under test.

7. A testing system according to claim 6, wherein said power supply is interruptible under control of said radio monitoring means and said server computer.

8. A testing system according to claim 3, further comprising analysis means for automatically analyzing said data stored in said central data file.

9. A method, comprising:
testing a radio device having a software radio stack comprising a plurality of logical layers through which radio messages comprising data are processed in accordance with a radio protocol;
altering data of a radio message en route through one of said plurality of logical layers of said software radio stack by:
receiving the radio message at a first layer of said plurality of logical layers of said software radio stack, the radio message comprising one or more fields;
creating a modified radio message by modifying data of one of the fields of the received radio message; and
transferring the modified radio message to a second layer of said plurality of logical layers of said software radio stack; and
providing response data from said software radio stack to a test controller.

10. A method according to claim 9, further comprising analyzing said response data.

11. A method according to claim 10, wherein over air radio messages are monitored by a radio message monitor, and further provided to said test controller for analysis together with said response data.

12. A method according to claim 11, wherein the power supplied to said radio device by an interruptible power supply is interrupted under control of said radio message monitor.

13. A program code memory storing program code which, when executed on a testing computer, causes said testing computer to perform a method comprising:
   testing a radio device having a software radio stack comprising a plurality of logical layers through which radio messages comprising data are processed in accordance with a radio protocol;
   altering data of a radio message en route through one of said plurality of logical layers of said software radio stack by:
      receiving the radio message at a first layer of said plurality of logical layers of said software radio stack, the radio message comprising one or more fields;
      creating a modified radio message by modifying data of one of the fields of the received radio message; and
      transferring the modified radio message to a second layer of said plurality of logical layers of said software radio stack; and
   receiving response data from said software radio stack.

14. A program code memory according to claim 13, wherein the method further comprises:
   analyzing said response data.

15. A program code memory according to claim 14, wherein the method further comprises:
   intercepting over air radio messages; and
   analyzing the intercepted radio messages together with said response data.

16. A testing system according to claim 1 wherein said stack perturbation means is linked to said test control means by a link that is distinct from said software radio stack.

17. A method according to claim 9 wherein altering data of a radio message includes altering, under control of a stack perturbation module linked to said software radio stack and to said test controller, the data of the radio message en route through the one logical layer of said software radio stack.

18. A method according to claim 9, wherein altering data of a radio message includes modifying a length field of the received radio message.

19. A method according to claim 9, wherein altering data of a radio message includes modifying a network address field of the received radio message.

20. A method according to claim 9, wherein altering data of a radio message includes altering a bit that signifies whether encryption is enabled or not.

21. A method according to claim 9, wherein altering data of a radio message includes inputting data into a state of one of said plurality of logical layers of said software radio stack.

22. A testing system according to claim 1, wherein the first layer of said plurality of logical layers is an application layer.

23. A testing system according to claim 1, wherein the first layer of said plurality of logical layers is a physical layer and the second layer of said plurality of logical layers is a medium access control layer.

* * * * *